Feb. 11, 1958 R. J. LEGOIS 2,822,623
MARKING GAGE HAVING MEANS FOR SECURING SAID GAGE TO WORKPIECES
Filed March 17, 1955
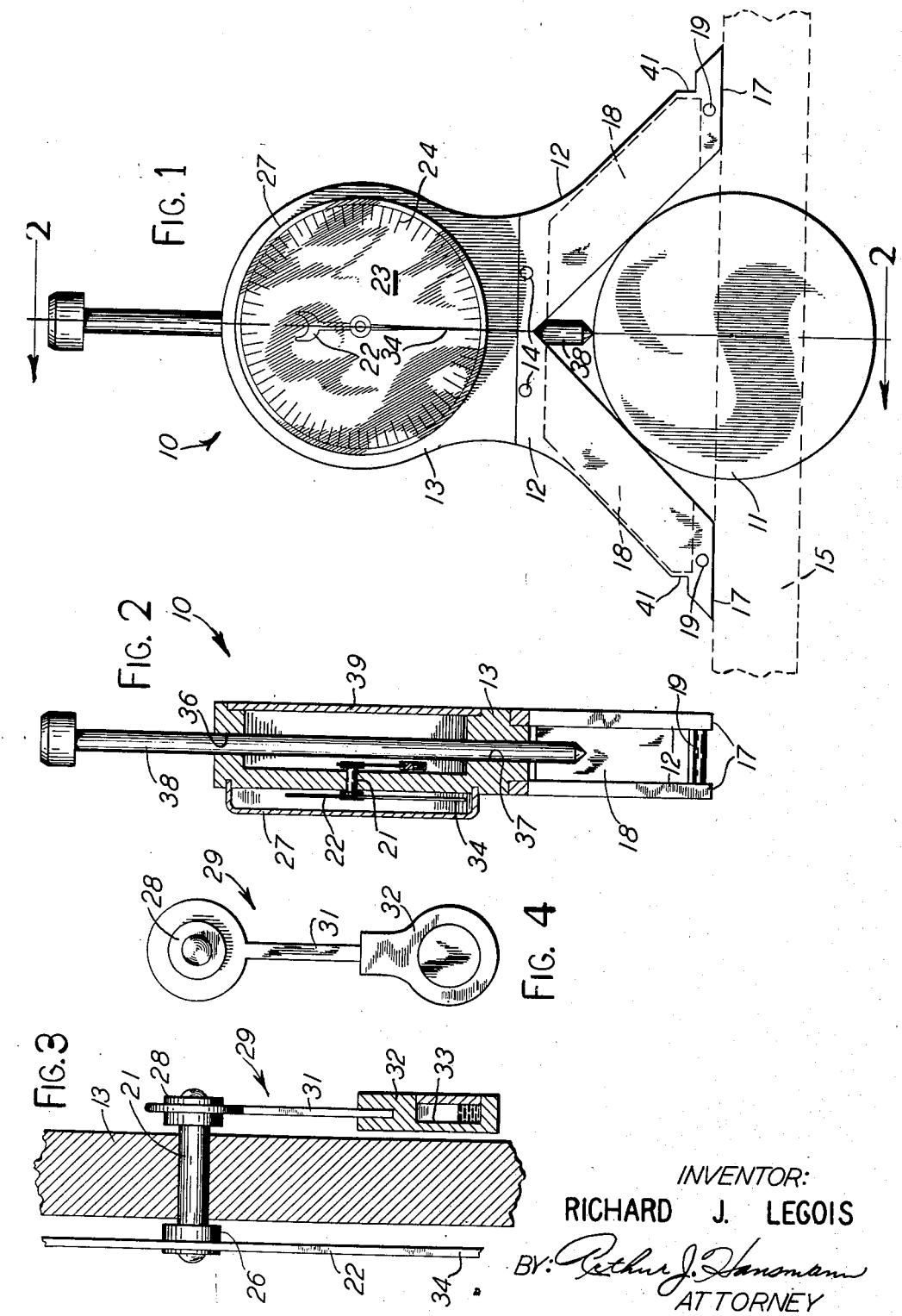
INVENTOR:
RICHARD J. LEGOIS
BY: *Arthur J. Hansmann*
ATTORNEY

United States Patent Office 2,822,623
Patented Feb. 11, 1958

2,822,623

MARKING GAGE HAVING MEANS FOR SECURING SAID GAGE TO WORKPIECES

Richard J. Legois, Racine, Wis.

Application March 17, 1955, Serial No. 494,938

4 Claims. (Cl. 33—189)

This invention relates to marking gages, and, more particularly, it relates to a marking gage with means for securing the gage to the workpieces.

In connection with the duties of a machinist or a tool maker, it is customary that a shaft, for example, be provided with a point which will indicate the top center of the shaft. This point then serves as a guide for drilling the shaft in an accurate radial direction. It is known that marking gages exist for the purpose of aiding the man in locating such points on a cylindrical workpiece. Some of the gages consist of a pair of lower angled legs for spanning the workpiece, with a dial and a pendulum pointer attached above the legs while a punch extends through the gage. With these gages, indicator points can be located in a desired position around the circumference of a cylindrical workpiece. However, it is difficult to clamp the workpiece for machining since the gage, workpiece, and the clamping devices must all be controlled at one time.

Therefore, it is an object of this invention to provide a marking gage with means for securing the gage to the workpieces in a set position and thereby permit the operator to manipulate the workpiece or clamping devices without holding the gage on the workpiece.

Another object of this invention is to provide a marking gage which will expedite the location of circumferential work points in any desired location on cylindrical pieces.

Another object is to provide a marking gage which is accurate and will remain accurate under conditions of use such as in a machine shop.

Other objects and advantages will become apparent upon reading the following description in conjunction with the accompanying drawings, wherein:

Fig. 1 is a front view of a preferred embodiment of this invention with a cylindrical workpiece shown in full lines and a flat workpiece shown in dotted lines.

Fig. 2 is a sectional view taken on the line 2—2 of Fig. 1, with the workpieces removed.

Fig. 3 is an enlarged sectional view of a fragment of view of Fig. 2.

Fig. 4 is a rear view of parts shown in Fig. 3.

Similar reference numerals refer to similar parts throughout the several views.

In Fig. 1, a marking gage 10 is shown disposed on a cylindrical workpiece 11 which is to be drilled or otherwise machined at a particular point. The gage 10 is provided with a pair of hollow legs 12 attached to a body 13 of the gage 10 to diverge therefrom. The legs are shown attached to the body 13 by rivets 14, and the body is preferably made of a non-magnetic metal, such as aluminum or brass, while the legs are made of steel. Also, the base of the legs are formed with aligned horizontal edges 17 to permit positioning of the gage 10 on a flat workpiece 15 (as indicated by the dotted lines in Fig. 1) rather than spanning the piece, as shown.

As shown in Fig. 2, the interiors of the legs 12 are hollow to each receive a magnet 18 to hold the gage 10 to the piece 11 in the upright position shown and in any other radial position around the piece 11. The magnets can be affixed to the legs by rivets 19 or the like to press-fit the magnets within the legs. Thus, the magnets 18 are sufficiently strong to hold the gage 10 against its own weight, and, the magnets 18 attract in both the direction of the piece 11, along the insides of the legs, and in the direction of the leg edges 17 to cause the gage to also be securable onto the flat workpiece, such as piece 15.

The gage body 13 is preferably shaped, as shown in Fig. 2, to be recessed to the rear and rotatably receive a shaft 21 at the front. The forward end of the shaft 21 is suitably attached to a pointer 22 which is non-rotatable with respect to the shaft. The front side of the body 13 contains a dial 23 graduated in circularly disposed markings 24 indicating degrees of a circle. The pointer is disposed immediately in front of the dial 23 to align with the markings while a removable shoulder 26 is secured to the shaft 21 to keep the pointer clear of the dial 23. It is preferred that the body 13 also contain a transparent face plate 27 suitably attached to the body over the dial and the pointer to protect them.

The rearward end of the shaft 21 also contains a removable shoulder 28 which supports a pendulum 29 away from the adjacent face of the body 13. The pendulum consists of an eye-bolt type of arm 31 engaged with the shoulder 28 to depend therefrom and support a weight or container 32. The latter includes a cavity 33 for receiving mercury or the like to weight the pendulum 29 and maintain it in a vertical plane position with the container 32 always at the lowest point regardless of the position of the gage 10. Of course, the pointer 22 includes an indicator end 34 and the pointer and the pendulum are radially aligned on the shaft 21 to constantly position the end 34 in downward position. The pendulum and the pointer are non-magnetic so that they are not influenced by the magnets 18.

The body 13 is further provided with vertically aligned holes 36 and 37 to snugly receive a punch 38 which is axially movable in the holes. The lower end of the punch is pointed while the upper end is provided with a head. Of course, the punch 38 bisects the gage legs 12 and the zero point of the dial 23 is aligned with the punch. A back cover plate 39 is attached to the body 13 to preferably seal the recess in the body.

With this construction, the gage 10 can be positioned onto a conductive workpiece 11 or the like and the gage will maintain a fixed position with respect to the workpiece since the magnets 18 secure the gage to the workpiece. The gage and the workpiece can then be rotated to a desired position where the gage will indicate top center of the workpiece, as shown in Fig. 1, or where the gage will indicate any other desired rotated position of the workpiece. The machine operator is then free to set up the workpiece in the machine without holding the gage, and he can clamp the workpiece upon re-checking the gage. The punch 38 can then be tapped to mark the workpiece for drilling or other operations.

If a non-conductive workpiece is employed, the magnets 18 will not be effective and, therefore, it is preferred that the legs 12 be provided with notches 41 or other means through which the gage 10 can be clamped to the workpiece by tying or the like.

In marking a flat workpiece, such as the piece 15, the gage can be employed as a level with the magnets 18 securing the gage to the piece. The workpiece can then be inclined, for instance, and the gage will not move on the piece while the operator adjusts and clamps the piece for drilling, milling or other machining at a selected angle as indicated on the gage dial. Thus, the magnets 18 are special in their molecular arrangement to effect attraction on both types of workpieces.

While a specific embodiment of this invention has been shown and described, and since certain changes could be made in the embodiment, the invention should be limited only by the scope of the appended claims.

I claim:

1. A marking gage comprising a body portion, a pair of legs attached to said body portion to diverge therefrom, a magnet mounted in each of said legs, a punch movably disposed to extend through said body and intermediate said legs, a shaft rotatably mounted in said body perpendicular to said punch, a non-magnetic pointer non-rotatably attached to a front end of said shaft to be disposed in a plane parallel to said punch, a non-magnetic pendulum non-rotatably attached to a rear end of said shaft to be disposed in a plane parallel to said punch and aligned with said pointer, a dial disposed on the face of said body adjacent said pointer, means attached to said body to enclose said dial and said pointer and said pendulum.

2. A marking gage comprising in combination a body portion including a circular dial on the front face thereof and a recess in the rear thereof, a pair of legs attached to one side of said body portion to diverge therefrom, a magnet disposed in each of said legs, a shaft rotatably mounted in said body portion to be disposed transverse to the plane of said dial of said gage and project through said front face thereof concentric with said dial, a non-magnetic pointer non-rotatably mounted on the front end of said shaft to be disposed adjacent said dial, a non-magnetic pendulum non-rotatably mounted on the rear end of said shaft to be disposed within said recess of said body portion, said pointer and said pendulum being transverse to said shaft and parallel to each other, a punch axially movably mounted in said body portion at opposite walls of said recess to be transverse to said shaft and slidable intermediate said legs, a transparent member attached to said body portion to enclose said dial and said pointer, a member attached to said body portion to enclose said recess of said body portion.

3. A marking gage comprising in combination a body portion made of a non-magnetic material and having a recess in the rear thereof, a pair of hollow legs made of a magnetic material and attached to one side of said body portion to diverge therefrom, a magnet disposed in the hollow of each of said legs and thereby provide two magnets with the latter of sufficient power to magnetically attract with a force greater than the total weight of said gage, a shaft rotatably disposed in said body portion transverse to the plane of said legs, a circular dial on the front of said body portion concentric with said shaft, a non-magnetic pointer non-rotatably and transversely attached to the front end of said shaft, a non-magnetic pendulum non-rotatably and transversely attached to the rear end of said shaft aligned with said pointer and disposed in said recess of said body portion, a transparent member attached to the face of said body portion to enclose said dial and said pointer, a member attached to the rear of said body portion to enclose said recess thereof, a punch axially movably supported on said body portion on opposite sides of said recess thereof to be disposed transverse to said shaft and to bisect said legs.

4. A marking gage comprising in combination a body portion made of a non-magnetic material and having a recess in the rear thereof, a pair of hollow legs made of a magnetic material and attached to one side of said body portion to diverge therefrom and terminate in aligned free edges, a magnet disposed in the hollow of each of said legs to thereby provide two magnets, said magnets being of sufficient combined power to magnetically attract with a force of a magnitude of at least the weight of said gage, each said magnet constructed to magnetically attract along both the insides of said legs and said free edges, a shaft rotatably disposed in said body portion transverse to the line between said free edges, a circular dial on the front of said body portion transversely concentric with said shaft, a non-magnetic pointer non-rotatably and transversely attached to the front end of said shaft, a non-magnetic pendulum non-rotatably and transversely attached to the rear end of said shaft aligned with said pointer and disposed in said recess of said body portion, a transparent member attached to the face of said body portion to enclose said dial and said pointer, a plate attached to the rear of said body portion to enclose said recess thereof, a punch axially movably supported on said body portion to be disposed transverse to said shaft and to bisect said legs.

References Cited in the file of this patent

UNITED STATES PATENTS

| 751,763 | Wagor | Feb. 9, 1904 |
| 835,986 | Sheflott | Nov. 13, 1906 |
| 1,094,583 | Moonen | Apr. 28, 1914 |
| 2,113,524 | Wolfe | Apr. 5, 1938 |
| 2,292,968 | Peters | Aug. 11, 1942 |
| 2,572,999 | Elliott | Oct. 30, 1951 |

FOREIGN PATENTS

| 642,813 | Great Britain | Sept. 13, 1950 |